(12) United States Patent
Hanse

(10) Patent No.: US 7,886,606 B2
(45) Date of Patent: Feb. 15, 2011

(54) VIBRATION TABLE

(76) Inventor: John K Hanse, 235 Hubbard St., Allegan, MI (US) 49010

( * ) Notice: Subject to any disclaimer, the term of this patent is extended or adjusted under 35 U.S.C. 154(b) by 266 days.

(21) Appl. No.: 12/096,972

(22) PCT Filed: Apr. 10, 2006

(86) PCT No.: PCT/US2006/013277
§ 371 (c)(1),
(2), (4) Date: Jun. 11, 2008

(87) PCT Pub. No.: WO2006/110636
PCT Pub. Date: Oct. 19, 2006

(65) Prior Publication Data
US 2009/0223298 A1    Sep. 10, 2009

Related U.S. Application Data

(60) Provisional application No. 60/669,690, filed on Apr. 8, 2005.

(51) Int. Cl.
*B06B 3/00* (2006.01)
(52) U.S. Cl. .......................................... 73/663
(58) Field of Classification Search ............... 73/663, 73/664, 665, 666, 667, 668
See application file for complete search history.

(56) References Cited

U.S. PATENT DOCUMENTS

| 3,241,358 | A | * | 3/1966 | Booth et al. | 73/571 |
| 5,412,991 | A | | 5/1995 | Hobbs | |
| 5,594,177 | A | | 1/1997 | Hanse | |
| 5,804,732 | A | * | 9/1998 | Wetzel et al. | 73/663 |

* cited by examiner

*Primary Examiner*—Hezron Williams
*Assistant Examiner*—Rose M Miller
(74) *Attorney, Agent, or Firm*—Waters & Associates; John A. Waters

(57) ABSTRACT

A vibration table for testing products employs threaded inserts for mounting the test products or fixtures therefor on the table. The threaded inserts have enlarged and elongated threaded shafts that engage threaded openings in the upper surface of the table, with enlarged heads on the inserts being positioned adjacent the outer surface of the table or the outer surface of an insulation layer mounted on the table. The inserts have elongated internally threaded openings therein, to which the test products or fixtures are bolted by elongated bolts. The inserts enhance the transmission of vibration forces to the test product with or without an insulating layer. They also provide improved temperature uniformity by providing air circulation between the test product and the table.

22 Claims, 7 Drawing Sheets

VIBRATION TABLE

CROSS REFERENCE TO RELATED APPLICATION

This application is based on and claims the priority date of Applicant's pending U.S. Provisional Application No. 60/669,690, filed Apr. 8, 2005, the disclosure of which is incorporated herein by reference.

BACKGROUND OF THE INVENTION

Vibration tables are used primarily in connection with test fixtures designed to test products under vibrating conditions. The general construction of vibration tables is well known. Generally they include upper and lower plates separated by spacers, with a vibrator mounted on the bottom of the lower plate and a test product mounted on the top of the upper plate. Representative vibration tables are shown in Applicant's U.S. Pat. No. 5,594,177 (which is incorporated by reference) and U.S. Pat. No. 5,402,991.

An object in the design of a vibration table is to provide a table that transmits a high proportion of the vibration energy to the test product over a desired frequency range. In order to accomplish these goals, it is generally desirable to make the table as rigid as possible and yet as light as possible. Rigidity maximizes higher frequency and higher energy transmission and minimizes resonant frequencies at low frequency ranges, while a light weight table minimizes energy loss that results from the mass of a heavy table. To accomplish these goals, tables are frequently made with a hollow or semi-hollow core. In Applicant's U.S. Pat. No. 5,594,177, the table includes spaced upper and lower plates connected together at the periphery by edge spacers and having intermediate spacers interconnecting the plates at intermediate positions.

Another feature of vibration tables is that they are frequently used to test products in high and low temperature environments. Thus, an insulating sheet is often bonded to the top of the upper plate. A metal sheet formed of titanium or the like can be mounted on top of the insulation. A problem with the incorporation of insulation in a shaker table is that the insulation can have a dampening effect on vibration that reduces the energy transmitted by the vibration table and the frequency response of the table. Prior tables typically have been limited to transmission of forces of under about 70 Gs RMS, with the great majority of the force being transmitted in a frequency range of about 1000-3000 Hz.

An object of the present invention is to provide a lightweight table that has improved energy responsiveness and a broader frequency spectrum and provides a means for uniform heating of a test product.

SUMMARY OF THE INVENTION

In accordance with the present invention, a vibration table having an upper surface, which may be covered by an insulation layer, employs a plurality of inserts for mounting a test product or a mounting fixture thereof to the upper surface. The insert comprises an enlarged externally threaded shaft having an enlarged head at an upper end. The insert also has a threaded internal opening therein extending in an axial direction inwardly from an open end in the upper end of the head. The externally threaded shaft extends through an opening in any insulation layer and into engagement with an internally threaded opening in the upper surface of the table. The test product or mounting fixture is mounted to the upper surface of the insert by a bolt that engages the threaded internal opening in the insert. The insert improves the transmission of vibration forces to the test product, notwithstanding the presence or absence of an insulation layer. The insert also provides improved temperature uniformity by providing for air circulation between the test product and the vibration table.

The externally threaded shaft on the insert has an outer diameter that is sufficiently large that the insert transmits acceleration forces from the table to the test product without substantial attenuation caused by the insert. Desirably, the external diameter of the threaded shaft on the insert is greater than 3/8 inches and preferably is at least about 3/4 inches. The threaded shaft on the insert can be locked in the opening in the upper plate by a bolt locking compound.

The preferred insert not only has an external diameter larger than a conventional 3/8 inch plate opening but it also has an internal threaded opening that is longer than the threaded opening in the mounting plate, so that longer attachment bolts can be employed. Both features improve thread contact area and thereby improve the force transmission properties of the table, even without the use of an insulating layer on the table.

DETAILED DESCRIPTION OF PREFERRED EMBODIMENT

Figure 1:
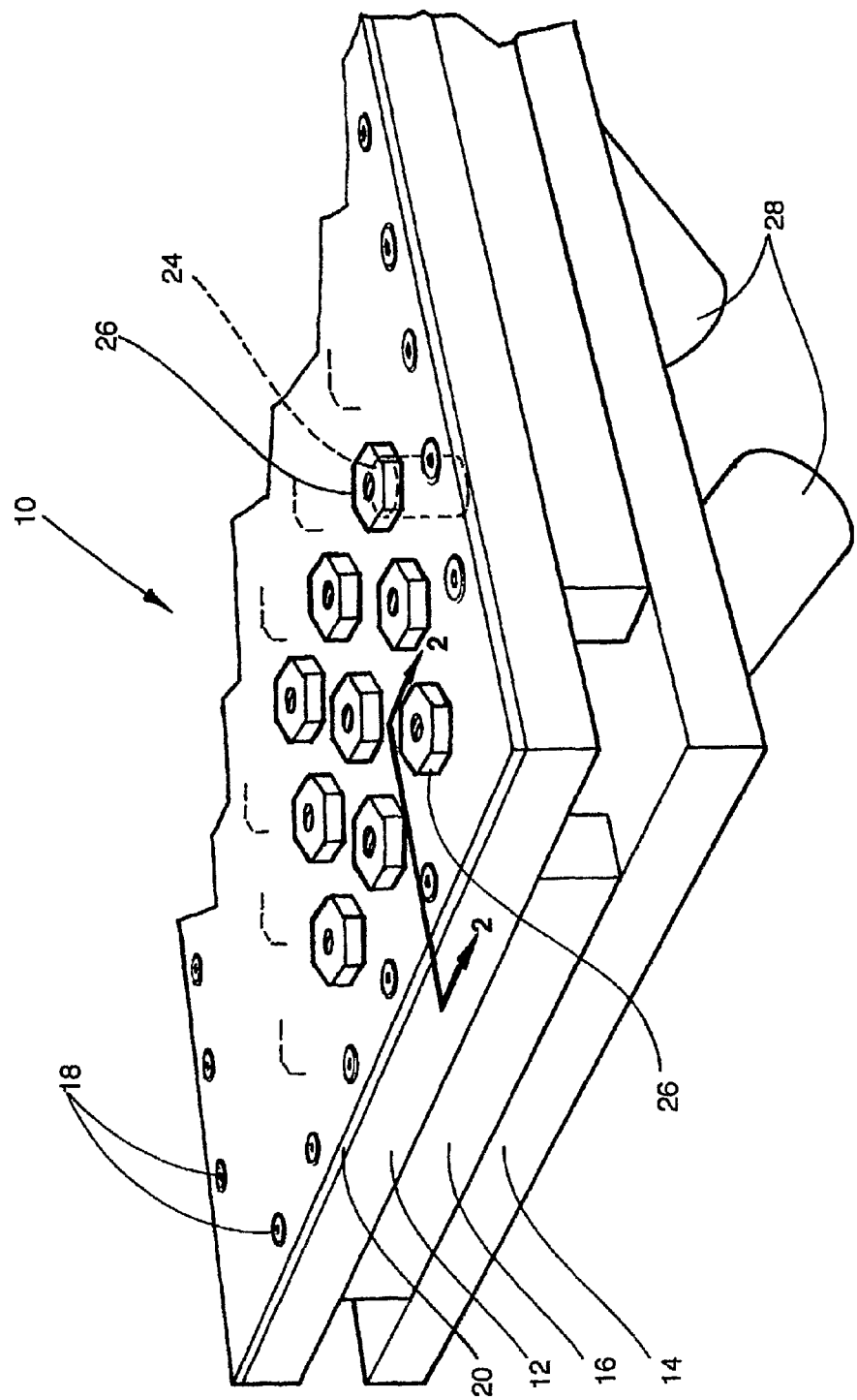
FIG. 1 is a perspective view of the improved vibration table of the present invention.
Figure 2:
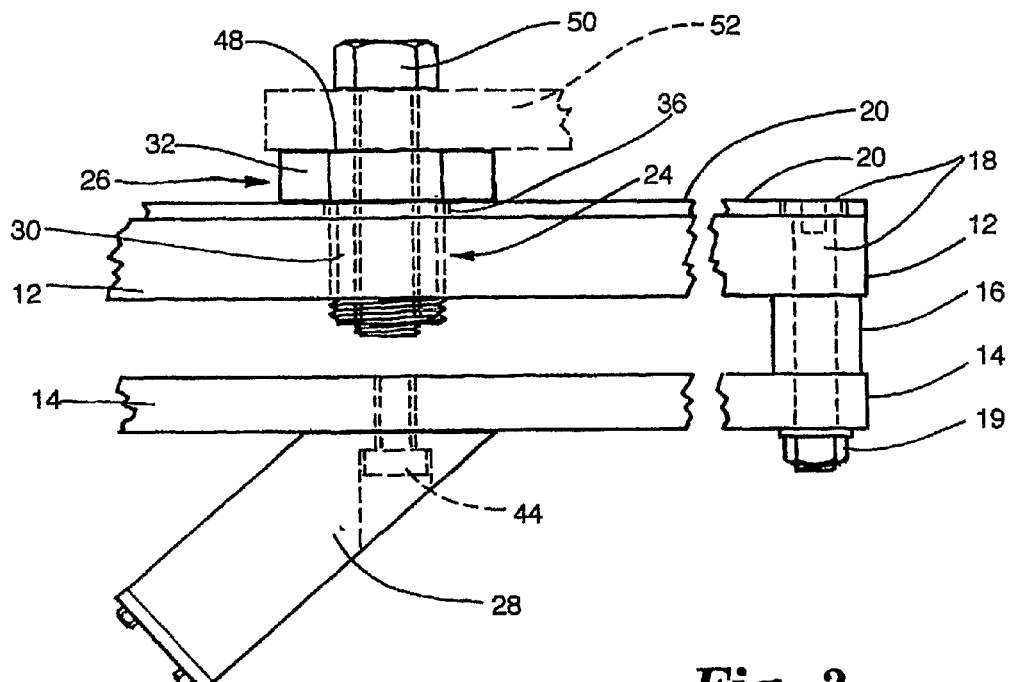
FIG. 2 is a fragmentary side elevational view taken along line 2-2 of FIG. 1, showing the spacer mounted in a shaker table and with a test product mounted thereon.
Figure 3:
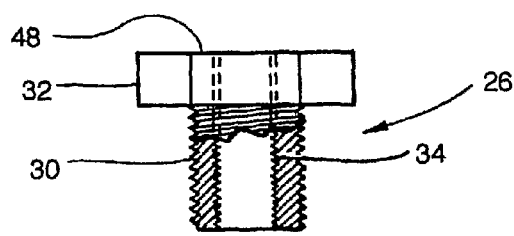
FIG. 3 is a plan view of an improved spacer of the present invention.
Figure 4:
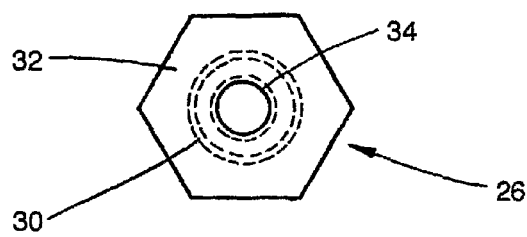
FIG. 4 is an end view of the spacer of FIG. 3.
Figure 5:
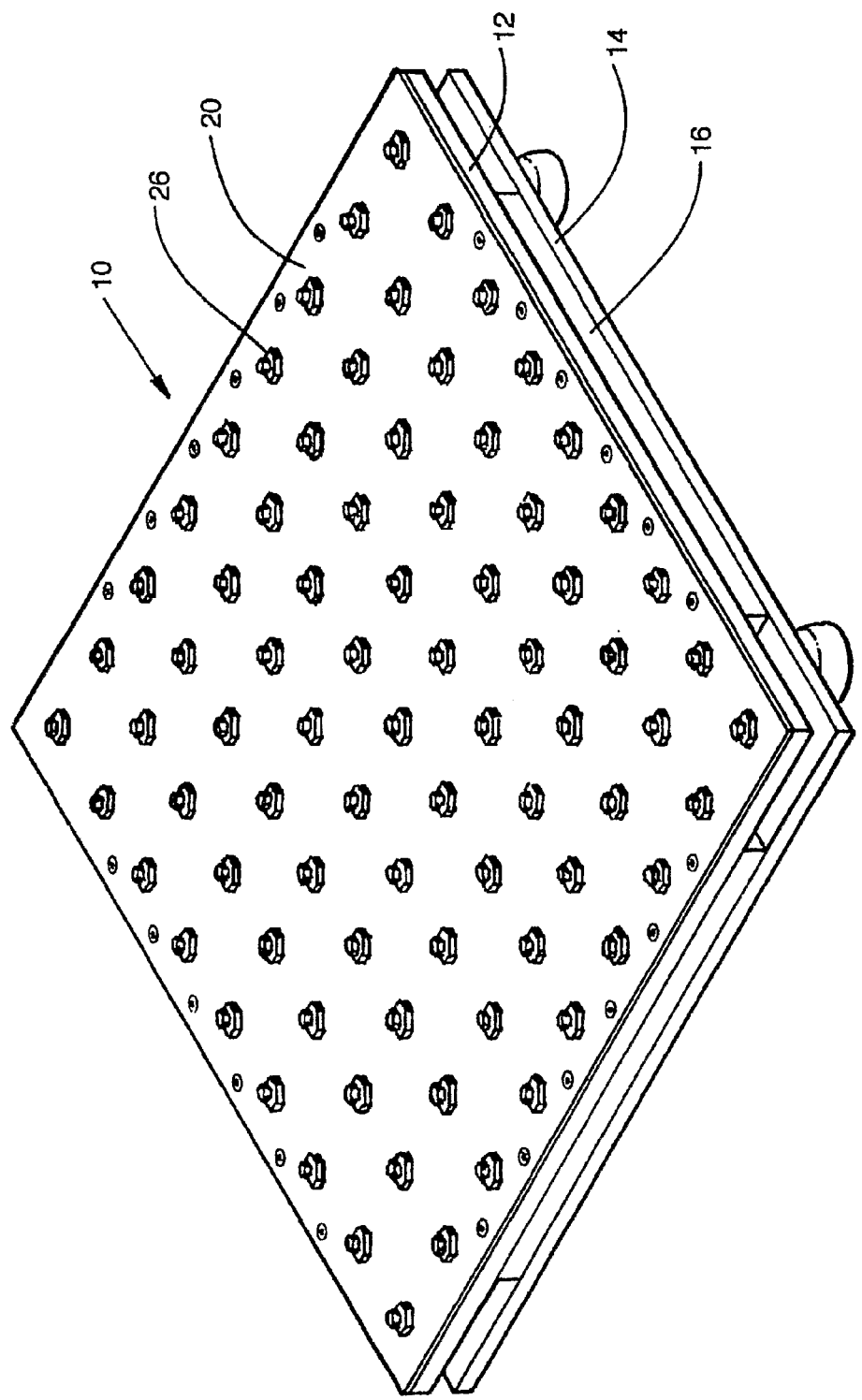
FIGS. 5 and 6 are perspective views of one embodiment of the present invention.
Figure 6:
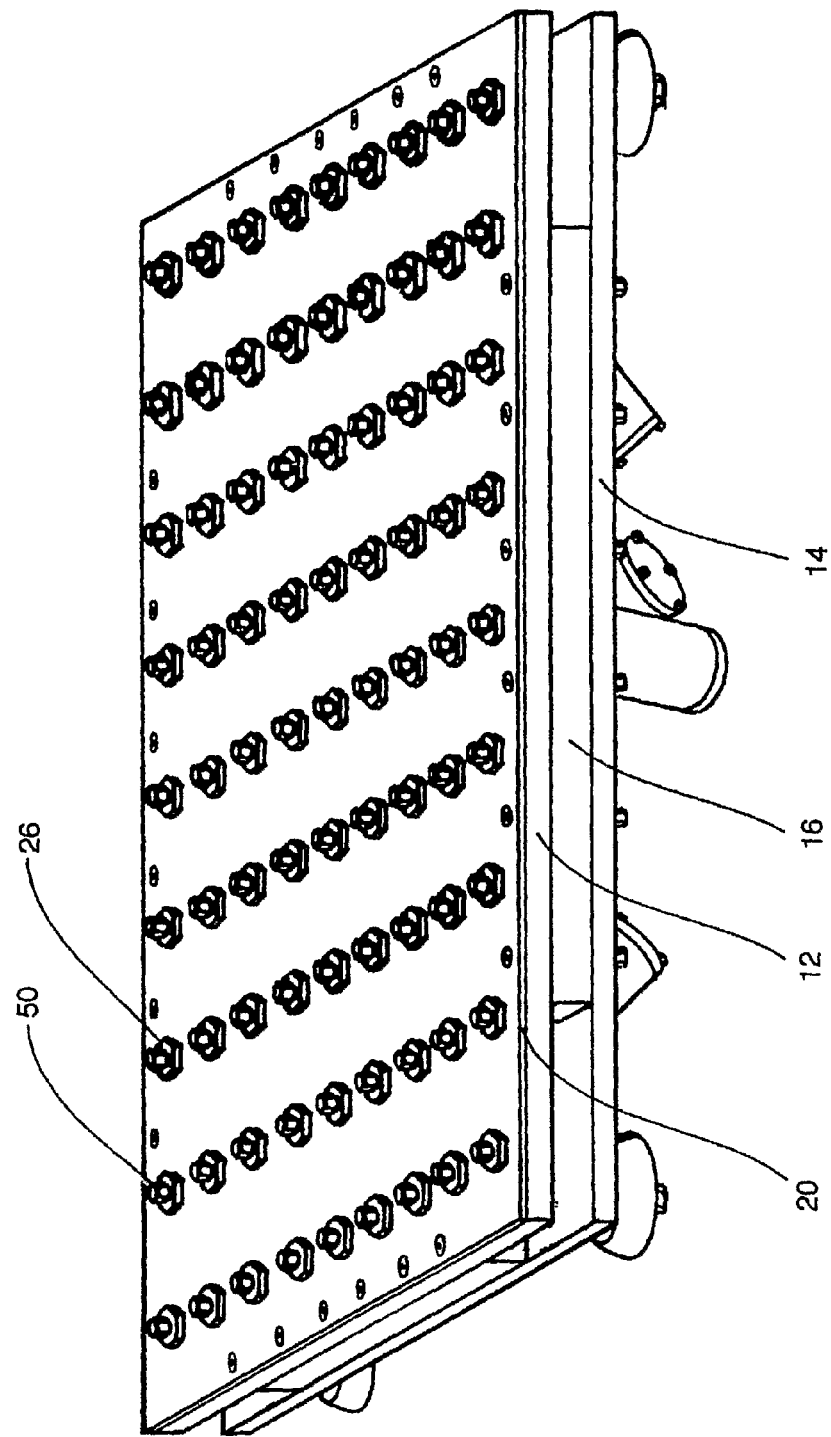
Figure 7:
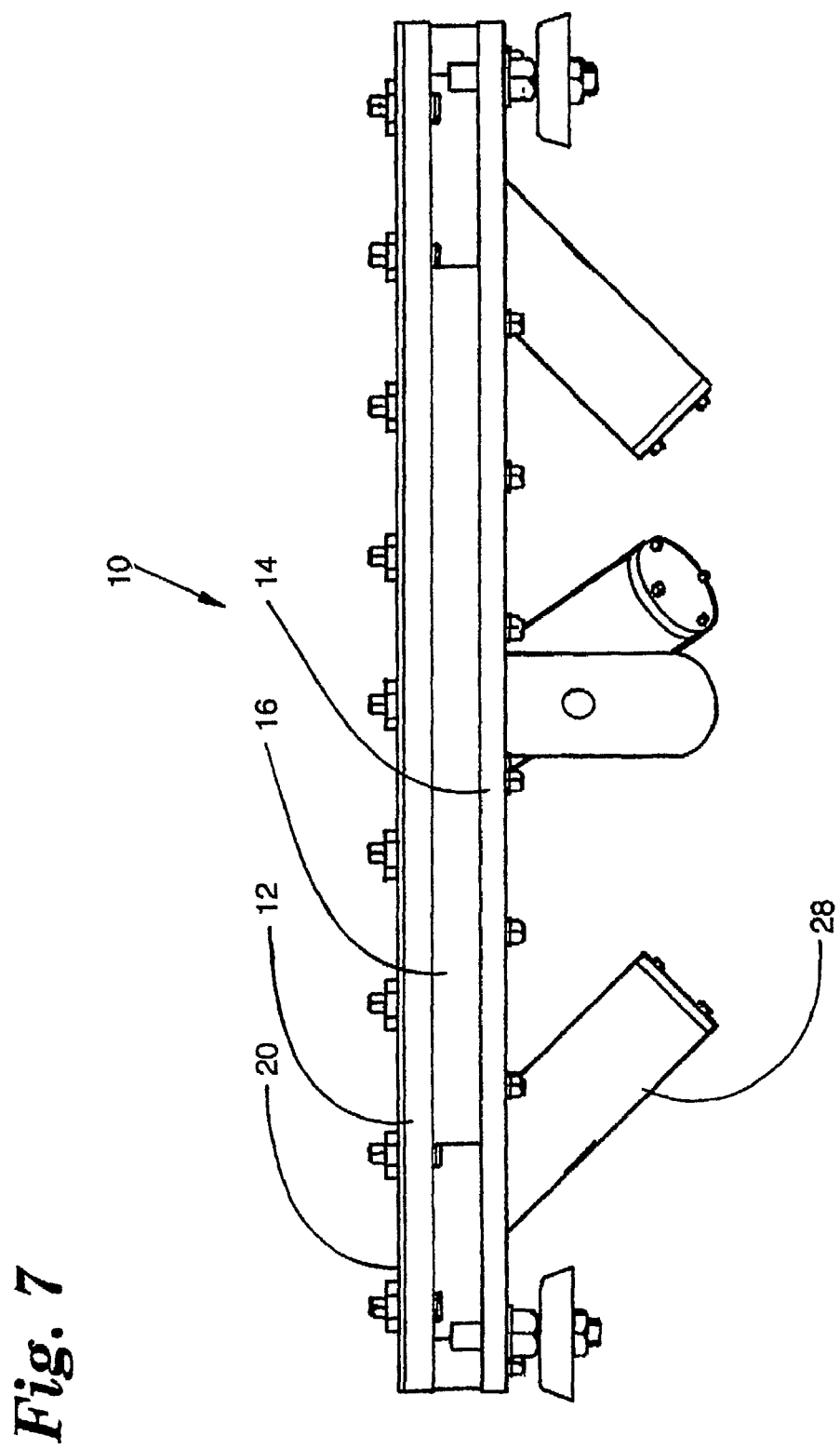
FIG. 7 is a side elevational view of the embodiment of FIGS. 5 and 6.
Figure 8:
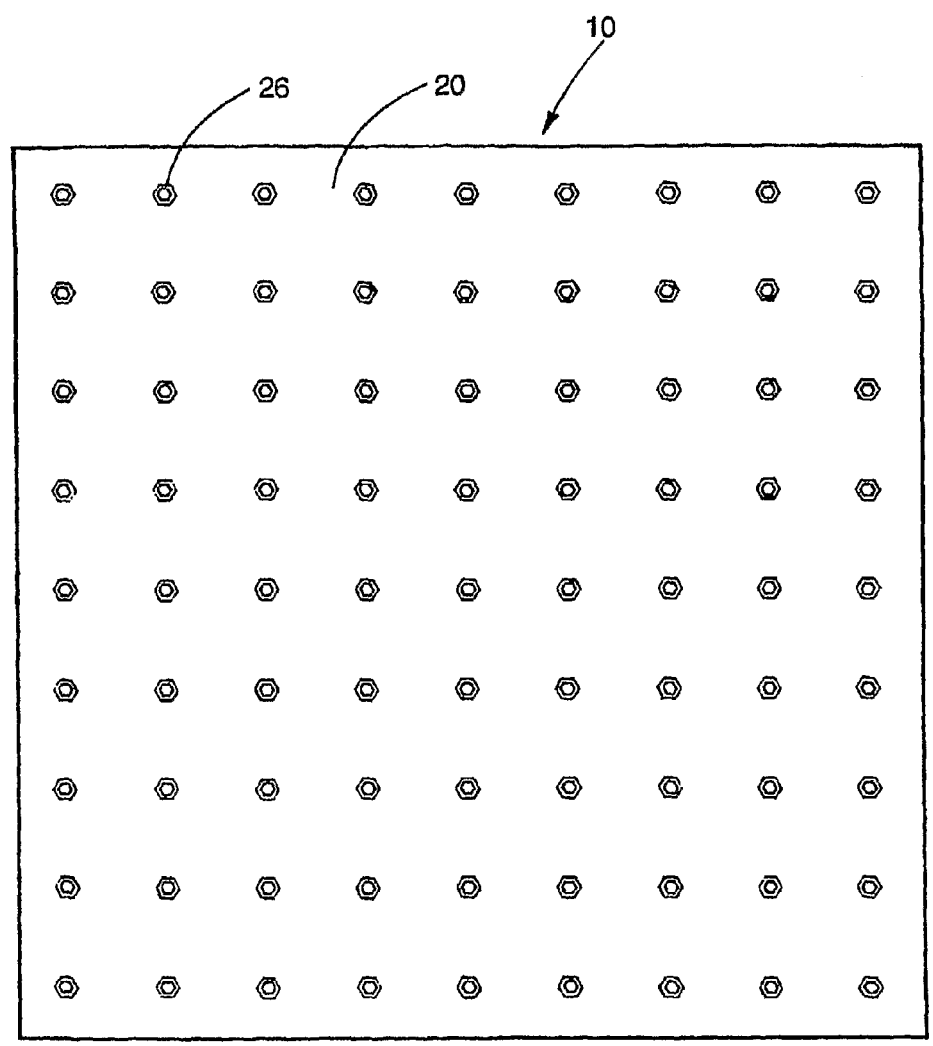
FIG. 8 is a top plan view of the embodiment of FIG. 7.
Figure 9:
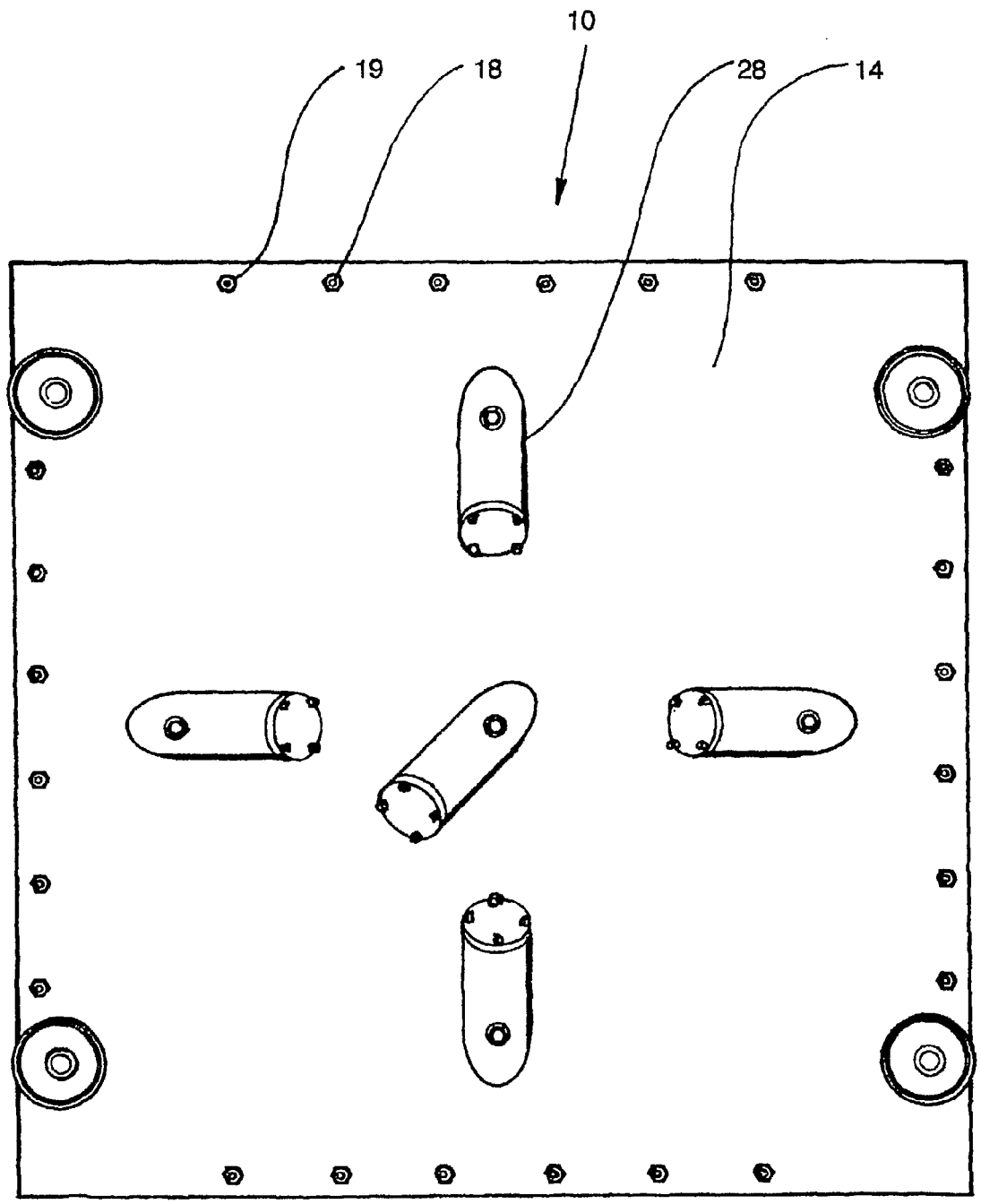
FIG. 9 is a bottom view of the embodiment of FIG. 7.

Referring now to the drawings, a shaker table 10 constructed in accordance with the present invention is shown in FIG. 1. Shaker table 10 includes an aluminum upper plate 12 (typically about one-half inch thick), lower plate 14, and edge spacers 16 separating the upper and lower plates. Edge spacers 16 are attached to the upper and lower plates by bolts 18 and typically space the plates about one-half inch apart. Bolts 18 typically are 3/8 inch internal hex head stainless steel bolts that extend all the way through the upper and lower plates and edge spacers and are secured by nuts 19 on the lower ends. Lock washers are positioned adjacent the heads. These bolts are tightened to a torque of about 30-45 ft lbs for desired rigidity. The higher torque limit is determined by the bolt strength. The lower limit is significant for energy transmission. The G forces transmitted by the table drop off significantly when a lower torque setting is used.

An insulating sheet or layer 20, preferably a ceramic material, is bonded on the top of upper plate 12. A metal top plate formed of titanium or the like can be positioned on the top of the insulating sheet but is not essential in the present invention. An insulating sheet is generally employed, but there are some applications where an insulating sheet is not used.

The insulating sheet and upper surface of plate 12 include a plurality of openings 36 and 24, respectively, spaced in a conventional pattern (typically a rectangular grid on four inch or 100 mm centers) over the top of the vibrator table. The openings in the upper plate are internally threaded. These openings are larger than in a conventional vibration table to accommodate novel inserts 26 of the present invention.

Vibrators 28 of conventional design are mounted on the underside of the lower plate. At least some of the vibrators are mounted at an angle with respect to the bottom plate and skewed in different directions in order to provide uniform multi-axis excitation. Bolts 44 extend upwardly through and into ends of vibrators 28 and into the lower plate to mount the vibrators securely to the bottom of lower plate 14.

The inserts 26 include an externally threaded shaft 30 with a head 32 on one end. The head can have a hexagonal shape. The inserts have internal threaded openings 34 therethrough. Inserts 26 extend through openings 36 in the insulator sheet 20 and then are threaded into internally threaded openings 24 in the upper plate. The inserts are threaded all the way into and preferably through the openings in the upper plate until the heads 32 of the inserts securely abut the insulator sheet 20. Desirably the insert shafts extend past the bottom of plate 12 (typically about ¼ inch).

Inserts 26 are mounted securely in threaded openings 24 in the upper plate. The inserts thus serve to provide a rigid extension of the upper plate above the insulator sheet. The torque applied to the inserts should be sufficient to snugly clamp the inserts to the upper plate. It is desired that the inserts be tightened in the openings 24 in the upper plate with a torque of approximately 120-130 foot pounds. The upper torque limit is set below the torque limit of the insert threads.

Inserts 26 in the preferred embodiment are ¾×1 inch stainless steel bolts with the head being 1¼ inch wide and about ¼ to ⅜ inches thick. In the exemplary embodiments, the insert bolts have 16 threads per inch, but this does not appear to be critical. Bolt diameter, however, is important. Smaller bolts of ⅜ inch diameter do not appear to transmit G forces as effectively. Bolt sizes greater than ⅜ inch should be used. The bolt diameter should be large enough so that there is a large enough thread contact area to transmit acceleration forces without substantial attenuation caused by the inserts. Bolt diameters larger than ¾ inch are generally less practical to produce and are not essential. The inserts are preferably locked in position by means of a bolt locking fluid or compound, such as a fluid sold under the brand name Locktite or the like.

With the inserts inserted as described, a test product may be mounted on the upper surface 48 of the insert by means of attachment bolts 50 that engage internal threaded openings 34 in the insert to attach the test product or a mounting fixture for the test product (both referred to by numeral 52) to the upper surface of the spacer. Some parts can be screwed directly to the table. Other parts require a mounting fixture. Attachment bolts 50 in the exemplary embodiment are ⅜ inch (10 mm) bolts. Bolts 50 can extend all the way through internal insert thread area. The extended thread area of the insert makes it possible to obtain a longer thread contact area with attachment bolt 50. This increased thread contact area improves the transmission of acceleration forces through the test part. The larger external diameter of the insert and the longer length of the internal threaded opening in insert and attachment bolt both are believed to contribute to the improved force transmission properties of the invention, such that the force transmission properties of the present invention are better than the force transmission properties of a conventional uninsulated aluminum plate where the test product is bolted directly to the plate with conventional ⅜ inch bolts.

There are a number of advantages to a shaker table constructed in this manner. The table is very rigid and responsive to vibration, such that acceleration forces of up to 120 Gs RMS or more can be transmitted to the table through the insert over a frequency range of up to about 10,000 Hz or more, with the vibration forces being distributed primarily over a range of about 1000-4000 Hz. A typical vibration table employing a comparable actuation force transmits vibrations of 70 Gs RMS or less, concentrated primarily in a frequency range of about 1000-3000 Hz. The new table also transmits substantially higher peak acceleration forces than prior vibration tables, and the forces are distributed more evenly over the concentrated frequency range.

Another advantage of the inserts of the present invention is that they space the test product or test product mounting fixture away from the insulation sheet on the upper plate. This makes it possible to maintain a more uniform temperature control around all the upper and lower surfaces of the test product. Test products are sometimes subjected to temperatures ranging from −100 to +200 C. In prior vibration tables, the product or its mounting fixture is mounted directly on the upper surface of the vibration table, where the upper surface prevents air flow under the test product and therefore produces different temperatures on the lower and upper side of the test product.

It should be understood that the foregoing is merely exemplary of the preferred practice of the present invention and that various changes in the details and arrangements of the embodiments disclosed herein may be made without departing from the spirit and scope of the present invention.

The invention claimed is:

1. In a vibration table having an upper surface on which test products are mounted by bolts that engage spaced internally threaded bolt openings in the upper surface, and wherein the upper surface is covered by an insulation layer comprising a sheet adhesively bonded to the upper surface, an improvement for mounting a test product or a mounting fixture for a test product to the upper surface so as to resist vibration damage to the insulation layer and restrict loss of vibration force due to the insulation layer, the improvement comprising an insert comprising an externally threaded shaft having an integral enlarged head at an upper end, the head being wider than the shaft at upper and lower ends of the head, the head having generally flat upper and lower surfaces on the upper and lower ends of the enlarged head, the insert having a threaded internal opening therein extending in an axial direction inwardly from an open end in the upper end of the head, the externally threaded shaft extending through an opening in the insulation layer and into engagement with an internally threaded insert opening in the upper surface of the table, the test product or mounting fixture for the test product being mounted to and tightened down against the upper surface of the enlarged head of the insert by a bolt that engages the threaded internal opening in the insert, the insert being threaded tightly into the table such that the lower surface of the head of the insert bears securely against the insulation layer, clamping the insulation layer in place and resisting separation of the insulation layer from the upper surface of the table and damage of the insulation layer during operation of the vibration table.

2. A vibration table as in claim 1 wherein the externally threaded shaft on the insert is substantially larger than a conventional ⅜ thick bolt of the type used for mounting products to vibration tables, the outer diameter of the shaft of the insert being sufficiently large that the insert transmits acceleration forces from the table to the test product with substantially reduced attenuation caused by the insert.

3. A vibration table as in claim 1 wherein the external diameter of the threaded shaft on the insert is greater than ⅜ inches.

4. A vibration table as in claim 3 wherein the external diameter of the threaded shaft on the insert is about ¾ inches or wider.

5. A vibration table as in claim 1 wherein the threaded shafts on the inserts are tightened in place in the insert openings with at least about 120 to 130 foot pounds of torque, the shafts further being locked in the openings in the upper surface by a bolt locking compound.

6. A vibration table as in claim 1 wherein the head on the insert is sufficiently thick that a test product mounted on the insert head is suspended above an upper surface of the insulation layer by a sufficient distance to permit a significant air flow between the test product and the upper surface of the insulation layer.

7. A vibration table as in claim 1 wherein the insert head is about one inch or more wide in a radial direction.

8. A vibration table as in claim 1 wherein the exterior of the shaft of the insert is about ¾ inch in diameter, the head of the insert is about one inch or more across, and the threaded interior opening therein is about ⅜ inches in diameter.

9. A vibration table as in claim 1 wherein the inserts are torqued down against the upper surface of the vibration table with a torque of about 120 to 130 foot pounds.

10. A vibration table as in claim 1 wherein the enlarged head of the insert is hexagonal.

11. A vibration table as in claim 1, wherein the insulation layer comprises a ceramic material.

12. In a vibration table having an upper surface on which a test product is mounted by means of spaced bolt openings therein, an improvement for mounting the test product or a mounting fixture for the test product to the upper surface, the improvement comprising an insert comprising an externally threaded shaft having an enlarged head at an upper end, the insert having a threaded interior axial opening therein extending inwardly from an open end in the upper end of the head, the externally threaded shaft extending through an insulation layer and engaging an internally threaded opening in the upper surface of the table, the test product or mounting fixture for the test product being mounted to the upper surface of the insert by a bolt that engages the threaded interior axial opening in the insert.

13. A vibration table as in claim 12 wherein the outer diameter of the insert is sufficiently greater than ⅜ inch and the length of the threaded interior opening in the insert is sufficiently greater than the thickness of the plate, such that the vibration table has substantially greater acceleration force transmitting properties than a conventional table wherein test products are attached directly to the top of the table by ⅜ inch bolts that thread into ⅜ inch threaded openings in the top of the table.

14. A vibration table as in claim 12 wherein the enlarged head of the insert is hexagonal.

15. A vibration table comprising: a mounting plate of predetermined thickness on which test products are mounted, the mounting plate having a plurality of enlarged internally threaded insert openings therein; a plurality of inserts, having threaded exterior shafts that engage internally threaded insert openings in the mounting plate, the inserts having internally threaded internal openings therein extending in an axial direction, the inserts and threaded internal openings having a length greater than the thickness of the mounting plate; and a plurality of elongated product attachment bolts that engage the test product or mounting fixture therefor, the attachment bolts engaging the threaded internal openings in the insert.

16. A vibration table as in claim 15 wherein the threaded exterior shafts of the inserts and the product attachment bolts extend completely through the mounting plate.

17. A vibration table as in claim 15 wherein the plurality of inserts have enlarged heads, the enlarged heads being hexagonal.

18. A vibration table comprising:
upper and lower vertically spaced plates formed of a material comprising aluminum, the plates being spaced apart by edge spacers that extend between the plates, the plates being fastened together by bolts that extend through the plates and the edge spacers, the upper plate including a spaced array of internally threaded insert openings extending therethrough, the openings being about three-quarters (¾) of an inch or more in diameter, the upper plate having a sheet of hard insulation material bonded by adhesive to the upper surface thereof, the insulation material having openings therein that correspond with the insert openings in the upper plate;
a plurality of inserts mounted in the insert openings, the inserts being formed of a material comprising steel and including integral threaded shafts and enlarged heads, the shafts mating with the insert openings in the upper plate, the head having spaced flat upper and lower surfaces thereon, the lower surface abutting and engaging the insulation material around the periphery of the insert openings, the inserts being threaded securely into the insert openings such that the lower surfaces of the heads on the inserts engage and clamp the insulating material in place against the upper surface of the upper plate, the inserts having axially extending threaded interior openings therein that are sized to engage product mounting bolts to mount test products on the vibration table;
whereby the inserts serve to clamp the insulation sheet securely to the upper surface of the upper plate while at the same time enhancing the transmitting of vibration energy from the upper plate to a test product Or test product mounting fixture.

19. A vibration table as in claim 18 wherein the threaded shafts of the inserts extend completely through the upper plate.

20. A vibration table as in claim 18 wherein the product mounting bolts extend completely through the upper plate.

21. A vibration table as in claim 18 wherein the enlarged heads of the inserts are hexagonal.

22. A vibration table as in claim 18, wherein the insulation material is ceramic.

* * * * *